United States Patent [19]  
Gutierrez et al.

[11] Patent Number: 4,839,070  
[45] Date of Patent: * Jun. 13, 1989

[54] POLYOLEFINIC SUCCINIMIDE POLYAMINE ALKYL ACETOACETATE ADDUCT DISPERSANTS

[75] Inventors: Antonio Gutierrez, Mercerville; Robert A. Kleist, Bayonne, both of N.J.

[73] Assignee: Exxon Chemical Patents Inc., Linden, N.J.

[*] Notice: The portion of the term of this patent subsequent to Jun. 13, 2006 has been disclaimed.

[21] Appl. No.: 51,146

[22] Filed: May 18, 1987

[51] Int. Cl.$^4$ .................................. C10M 133/16
[52] U.S. Cl. .................. 252/51.5 A; 252/32.7 E; 252/35; 252/39; 252/49.6; 252/51.5 R; 252/52 A; 252/56 R; 252/565; 252/56 D
[58] Field of Search ................ 252/51.5 A, 49.6

[56] References Cited

U.S. PATENT DOCUMENTS

| | | | |
|---|---|---|---|
| 3,215,707 | 11/1965 | Rense et al. | 260/326.3 |
| 3,280,034 | 10/1966 | Anzenberger et al. | 252/51.5 |
| 3,390,086 | 6/1968 | O'Halloran | 252/47.5 |
| 3,455,831 | 7/1969 | Davis | 252/51.5 |
| 3,455,832 | 7/1969 | Davis | 252/51.5 |
| 3,888,773 | 6/1975 | Nnadi et al. | 252/51.5 A |
| 3,927,041 | 12/1975 | Cengel et al. | 260/346.8 |
| 4,062,786 | 12/1977 | Brois et al. | 252/51.5 |
| 4,113,639 | 9/1978 | Lonstrup et al. | 252/51.5 |
| 4,116,876 | 9/1978 | Brois et al. | 252/49.6 |
| 4,123,373 | 10/1978 | Brois et al. | 252/48.6 |
| 4,234,435 | 11/1980 | Meinhardt et al. | 252/51.5 |
| 4,375,974 | 3/1983 | Maldonado et al. | 252/51.5 A |
| 4,447,348 | 5/1984 | Forsberg | 252/51.5 A |
| 4,521,318 | 6/1985 | Karol | 252/51.5 A |
| 4,548,724 | 10/1985 | Karol et al. | 252/51.5 |
| 4,579,675 | 4/1986 | Sawicki et al. | 252/51.5 |
| 4,612,132 | 9/1986 | Wollenberg et al. | 252/51.5 A |
| 4,614,603 | 9/1986 | Wollenberg et al. | 252/51.5 A |

OTHER PUBLICATIONS

Smalheer et al., "Lubricant Additives", 1967.
G. O. Torosyan et al., Institute of Organic Chemistry, Academy of Sciences of the Armenian SSR, translated from Zhurnal Organischeskoi Khimii, vol. 18, "Amines and Ammonium Compounds. CLX, Amides of Acetoacetic Acid", pp. 1229–1231.

Primary Examiner—William R. Dixon, Jr.
Assistant Examiner—Ellen McAvoy
Attorney, Agent, or Firm—E. T. Wheelock; J. B. Murray, Jr.

[57] ABSTRACT

This invention is to dispersants containing polyolefinic succinimide polyamine alkyl acetoacetate adducts of the general formula:

$$R^1-CH-C(=O)\diagdown N-(Z^1)_{n1}-(Z^2)_{n2}-(Z^3)_{n3}-R^3-T^1$$
$$CH_2-C(=O)\diagup$$

wherein $Z^1$ and $Z^3$ are the same or different and are moities of the formula:

$$\mathrm{(\!\!\!\!-\!R^2\!-\!N\!\!-\!\!\!\!)\!\!\!\!},$$
$$\phantom{xxxx}A'$$

$Z^2$ is a moiety of the formula:

$$-R^4-N\diagdown\!\!\!\begin{array}{c}C_mH_{2m}\\\\C_mH_{2m}\end{array}\!\!\!\diagup N-,$$

wherein $R^2$, $R^3$ and $R^4$ are the same or different and are alkylene of from 1 to 6 carbon atoms, m is an integer of from 1 to 5, each A' is independently selected from the group consisting of H, A and the moiety:

$$\mathrm{(\!\!-\!R^6\!-\!N\!\!-\!\!)_{n4}\!-\!R^3T^2}$$
$$\phantom{xxxx}A''$$

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

$$-N\diagdown\!\!\begin{array}{c}H\\A\end{array},\ -N\diagdown\!\!\begin{array}{c}A\\A\end{array},\ -B',\ \mathrm{and}\ -N\diagdown\!\!\begin{array}{c}C(=O)-CH-R^5\\|\\C-CH_2\\\|\\O\end{array}$$

wherein B' is substituted or unsubstituted alkyl or aryl-containing group, $n^1$ is an integer of 0 to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{M}_n$) between about 650 and 3,500, and wherein A comprises a tautomeric substituent of the formula:

$$-\underset{\underset{O}{\|}}{C}-CH_2-\underset{\underset{O}{\|}}{C}-R^{10}\ \longleftrightarrow\ -\underset{\underset{O}{\|}}{C}-CH=\underset{\underset{OH}{|}}{C}-R^{10}$$

wherein $R^{10}$ is substituted or unsubstituted alkyl or aryl containing groups, with the proviso at least one of the A' or A" groups comprises the tautomeric substituent.

48 Claims No Drawings

POLYOLEFINIC SUCCINIMIDE POLYAMINE ALKYL ACETOACETATE ADDUCT DISPERSANTS

CROSS-REFERENCE TO RELATED APPLICATIONS

This application is related to the following applications, all filed on even date herewith: Ser. No. 51,276 filed May 18, 1987, "Polyoplefinic Succinimide Polyamine Alkyl Acetoacetate Adducts"; "Polyolefinic Succinimide Polyamine Alkyl Acetoacetate and Substituted Acetate Adducts as Additives in Lubrication Oil Compositions"; Ser. No. 51,273 filed May 18, 1987 "Polyolefinic Succinimide Polyamine Alkyl Acetoacetate Adducts as Dispersants in Lubricating Oil Compositions".

FIELD OF THE INVENTION

This invention is to dispersants containing polyolefinic succinimide polyamine alkyl acetoacetate adducts of the general formula:

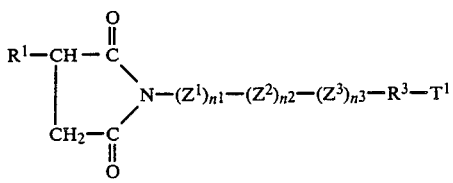

wherein $Z^1$ and $Z^3$ are the same or different and are moities of the formula:

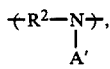

$Z^2$ is a moiety of the formula:

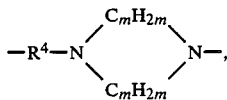

where $R^2$, $R^3$ and $R^4$ are the same or different and are alkylene of from 1 to 6 carbon atoms, m is an integer of from 1 to 5, each A' is independently selected from the group consisting of H, A and the moiety:

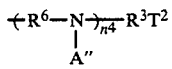

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

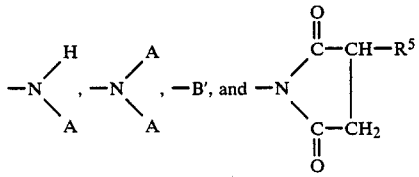

wherein B' is substituted or unsubstituted alkyl or aryl-containing group, $n^1$ is an integer or 0 to 10, $n^2$ is an integer of 0 to 10, $n^3$ is an integer of from 0 to 10, $n^4$ is an integer of from 0 to 10$\neq$, with the provisos that the sum os $n^1$, $n^2$, $n^3$, and $n^4$ is from 3 to 10 and the sum of $n^1$, $n^3$ and $n^4$ is at least 1, wherein $R^1$ and $R^5$ are independently an olefin polymer having a number average molecular weight ($\overline{M}_n$) between about 650 and 3,500, and wherein A comprises a tautomertic substituent of the formula:

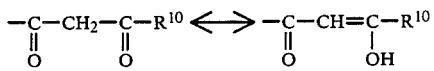

wherein $R^{10}$ is substituted or unsubstituted alkyl or aryl containing groups, with the proviso that at least one of the A' or A" groups comprises said tautomeric substituent.

The materials are especially useful as dispersants in concentrates, or in lubricating oil or fuel oil compositions.

BACKGROUND OF THE INVENTION

Polyalkene substituted carboxylic acids are widely known and used as additives in lubricating oils.

Illustrations of such materials are shown in numerous patents.

U.S. Pat. No. 3,215,707 discloses the reaction of chlorine with a mixture of polyolefin, having molecular weights up to about 50,000, and maleic anhydride.

U.S. Pat. No. 3,927,041 discloses the reaction of 300 to 3,000 molecular weight polybutene with a dicarboxylic acid or anhydride to form materials which can be used per se, or as esters, amides, imides, amidines, or the like in petroleum products.

U.S. Pat. No. 4,062,786 provides an example (No. 13) of a polyisobutylene succinic anhydride having a molecular weight of about 1300, a saponification number of about 100, and about 1.25 succinic anhydride units per polyisobutylene unit.

U.S. Pat. No. 4,123,373 shows a similar material having a molecular weight of about 1400, a saponification number of 80, and about 1.07 succinic anhydride units per polyisobutylene unit.

U.S. Pat. No. 4,234,435 also shows polyalkene substituted dicarboxylic acids derived from polyalkenes having an average molecular weight at 1,300 to 5,000.

Polyalkenyl succinic anhydrides have also been reacted with polyamines to form materials suitable for use as dispersants in lubricating oils.

U.S. Pat. Nos. 4,113,639 and 4,116,876 provides an example of alkenyl succinic anhydride in which the molecular weight of the alkenyl unit is about 1,3000, a saponification numbers of 103, and about 1.3 succinic anhydride units per hydrocarbon molecule. The material is then reacted with a polyamine and boric acid ('639) or with an amino alcohol and boric acid ('876).

U.S. Pat. No. 4,548,724 teaches a lubricating oil additive which is the reaction product of a polycarboxylic acid, e.g., 1,3,6-hexane tricarboxylic acid, with a polyisobutylene succinimide of a polyamine.

U.S. Pat. No. 4,579,675 relates to the reaction products of polyalkylene succinimides (derived from polyethylene-polyamines) and 1,3-dicarbonyl compounds. However, the reaction temperatures are such that the products are materials known as N-substituted enaminones. Therefore, polyisobutenyl succinimide, derived from polyisobutenyl succinic anhydride and diethylene triamine, was reacted with ethyl acetoacetate at 110° C. to form the corresponding N-substituted enaminone. Sulfonic acid is included in the reaction mixture to ensure the presence of enaminones. The by-products of this process are water rather than the alcohols produced by the inventive process disclosed herein. The enaminone reaction products are said to have detergent/dispersant properties when included in lubricating oil composition.

No known disclosure suggests either the products disclosed herein or the use of these products as dispersants aids.

SUMMARY OF THE INVENTION

This invention is to oleaginous compositions containing polyolefinic succinimide polyamine alkyl acetoacetate adducts of the general formula:

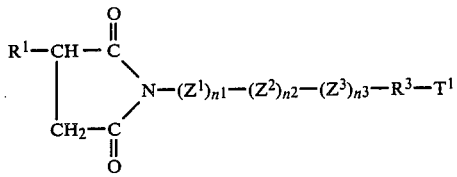

wherein $Z^1$ and $Z^2$ are the same or different and are moities of the formula:

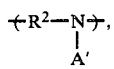

$Z^2$ is a moiety of the formula:

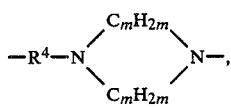

wherein $R^2$, $R^3$ and $R^4$ are the same or different and are alkylene of from 1 to 6 carbon atoms, m is an integer of from 1 to 5, each A' is independently selected from the group consisting of H, A and the moiety:

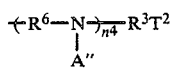

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

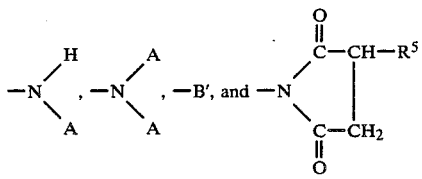

wherein B' is substituted or unsubstituted alkyl or aryl-containing group, $n^1$ is an integer of 0 to 10, $n^2$ is an integer of 0 to 10, $n^3$ is an integer of from 0 to 10, $n^4$ is an integer of form 0 to 10 with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{M}n$) between about 650 and 3,500, and wherein A comprises a tuatomeric substituent of the formula:

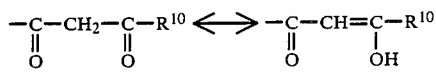

wherein $R^{10}$ is substituted or unsubstituted alkyl or aryl containing groups, with the proviso that at least one of the A' or A" groups comprises said tautomeric substituent.

Also included in the invention are mixtures of adducts fitting the above description, particularly adducts in which the mixtures contain adducts in which the $T^1$ and/or $T^2$ substituent is both the amide and the succinimide.

These materials are particularly useful as dispersants in lubricating oil and fuel compositions. They may be a portion of the additive packages used in producting motor oils, the lubricating oils compositions themselves, or fuel compositions.

DETAILED DESCRIPTION OF THE INVENTION

Lubricating oil compositions, e.g. automatic transmission fluids, heavy duty oils suitable for gasoline and diesel engine, etc., can be prepared using the compositions of this invention. Universal type crankcase oils, those in which the same lubricating oil composition is used for either gasoline or diesel engines, may also be prepared. These lubricating oil formulations convetionally contain several different types of additives that will supply the characteristics that are required for the particular use. Among these additives are included viscosity index improvers, antioxidants, corrosion inhibitors, detergents, dispersants, pour point depressants, antiwear agents, etc.

In the preparation of lubricating oil formulations, it is common practice to introduce the additives in the form of a concentrate (for instance, as an "ad pack") containing 10 to 80 weight percent, e.g., 20 to 80 weight percent, active ingredient in a solvent. The solvent may be a hydrocarbon oil, e.g., a mineral lubricating oil, or other suitable material. In forming finished lubricants, such as crankcase motor oils, these concentrates, in turn, may be diluted with 3 to 100, e.g., 5 to 40, parts by weight of lubricating oil per part by weight of the additive package. One uses concentrates, of course, to make the handling of the various constituent materials less difficult as well as to facilitate solution or dispersion of those materials in the final blend. The dispersants of this invention may be placed in such concentrates and concentrates form a variation of the invention.

THE COMPOSITIONS

Compositions made according to this invention may contain an oil lubricating viscosity and:
  a. polyolefinic succinimide polyamine alkyl acetoacetate adduct dispersants;
  b. auxiliary ashless dispersants;
  c. detergents having a high total base number; and
  d. antiwear additives.

The ashless dispersants of this invention are oil-soluble, dissolvable in oil with the aid of a suitable solvent, or are stably dispersible materials. Oil-soluble, dissolvable, or stably dispersible as that terminology is usen herein does not necessarily indicate that the materials are soluble, dissolvable, miscible, or capable of being suspended in oil in all proportions. It does mean, however, that the dispersant additives, for instance, are soluble or stably dispersible in oil to an extent sufficient to exert their intended effect in the environment in which the oil is employed. Moreover, the additional incorporation of other additives may also permit incorporation of higher levels of a particular dispersant, if desired.

Accordingly, while any effective amount of the dispersant additives can be incorporated into the lubricating oil composition, it is contemplated that such effective amount be sufficient to provide said lube oil composition with an amount of the additivve of typically from about 0.10 to about 15 e.g., 0.1 to 10, and preferably from about 0.1 to about 7 wt. %, based on the weight of said composition.

The dispersant additives of the present invention can be incorporated into the lubricating oil in any convenient way. Thus, they can be added directly to the oil by dispersing, or dissolving the same in the oil at the desired level of concentration typically with the aid of a suitable solvent such as toluene, or tetrahydrofuran. Such blending can occur at room temperature or elevated temperatures. Alternatively, the dispersant additives may be blended with a suitable oil-soluble solvent and base oil to form a concentrate, and then blending the concentrate with lubricating oil base stock to obtain the final formulation. Concentrates will typically contain from about 20 to about 60 wt. %, by weight dispersant additive, and typically from about 80 to about 20%, preferably from about 60 to about 20% by weight base oil, based on the concentrate weight.

The dispersant of this invention can be employed as additive concentrates comprising concentrated solutions or dispersions of the dispersant (in concentrate amounts hereinabove described), together with one or more of said other additives (said concentrate when consitiuting an additive mixture being referred to herein as an additive-package) whereby several aditives can be added simutaneously to the base oil to form the lubricating oil composition. Dissolution of the additive concentrate into the lubricating oil may be facilitated by solvents and by mixing accompanied with mild heating, but this is not essential. The concentrate or addivite-package will typically be formulated to contain the dispersant additive an optional additional additives in proper amounts to provide the desired concentration in the final formulation when the additive-package is combined with a predetermined amount of base lubricant. Thus, the dispersant of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (A.I.) content of the additive, and/or upon the total weight of any additive-package, or formulation which will be the sum of the A.I. weight of each additive plus the weight of the total oil or diluent.

Depending upon the use to which the compositions are ultimately placed, the compositions may also include other dispersants, detergents/rust inhibitors, antiwear agents, antioxidants, friction modifiers, pour point depressants, viscosity index improvers, compatibility agents and the like.

The compositions of the mixture may contain the active agents listed above (and which are discussed separately below) in amounts effective to provide their respective functions as well as others which will be specified elsewhere.

The stabilized ad packs of this invention may be blended with base oil and the following additives in amounts effective to provide their normal attendant functions. These additive effective amounts are illustrated as follows:

| Additive | Wt. % (A.I.) (Broad) | Wt. % (A.I.) (Preferred) |
|---|---|---|
| Viscosity Modifier | 0.01–12 | 0.1–16 |
| Corrosion Inhibitor | 0.01–5 | 0.01–1.5 |
| Oxidation Inhibitor | 0.01–5 | 0.01–1.5 |
| Dispersants (Total) | 0.1–20 | 0.1–14 |
| Pour Point Depressant | 0.01–5 | 0.01–1.5 |
| Antifoaming Agents | 0.001–3 | 0.001–0.15 |
| Antiwear Agents | 0.001–5 | 0.001–1.5 |
| Friction Modifiers | 0.01–5 | 0.01–1.5 |
| Detergents/Rust Inhibitor | 0.01–20 | 0.01–1.5 |
| Mineral Oil Base | Balance | Balance |

When the compositions of the invention are used in the form of lubricating oil compositions, such as automotive crankcase lubricating oil compositions, a major amount of a lubricating oil may be included in the composition. Broadly, the composition may contain about 85 to about 99.99 weight percent of a lubricating oil. Preferably, about 93 to about 99.8 weight percent of the lubricating oil. The term "lubricating oil" is intended to include not only hydrocarbon oils derived from petroleum but also synthetic oils such as alkyl esters of dicarboxylic acids polyglycols and alcohols, polyalphaolefins, alkyl benzenes, organic esters of phosphoric acids, polysilicone oils, etc.

When the compositions of the invention are provided in the form of concentrates, with or without the other noted aditives, a minor amount, e.g., up to about 50 percent by weight, of a solvent, mineral or synthetic oil may be included to enhance the handling properties of the concentrate.

When the compositions are used in normally liquid petroleum fuels such as gasoline, and middle distillates boiling from about 66° C. to 430° C., including kerosene, diesel fuels, home heating fuel oil, jet fuels. etc., a concentration of the additive in the fuel in the range of 0.001 to 0.5, preferably about 0.001 to 0.1 weight percent, based on the weight of the total composition will usually be employed.

DISPERSANT

As has been noted before, this invention is to compositions containing, as dispersants, polyolefinic succinimide polyamine alkyl acetoacetate adducts of the general formula (I):

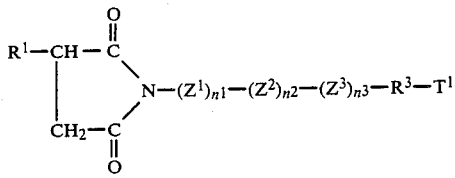

wherein $Z^1$ and $Z^3$ are the same or different and are moities of the formula:

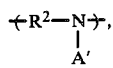

$Z^2$ is a moiety of the formula:

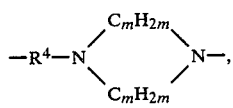

wherein $R^2$, $R^3$ and $R^4$ are the same or dirrerent and are alkylene of from 1 to 6 carbon atoms, m is an integer of from 1 to 5, each A' is independently selected from the group consisting of H, A and the moiety:

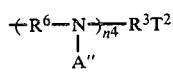

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

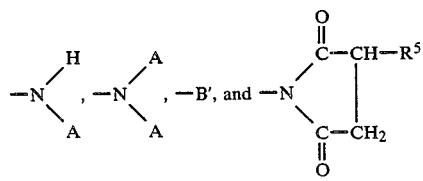

wherein B' is substituted or susubtituted alkyl or aryl-containing group, $n^1$ is an integer of 0 to 10, $n^2$ is an integer of from 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{Mn}$) between about 650 and 3,500, and wherein A comprises a tautomeric sunstituent of the formula (Ia):

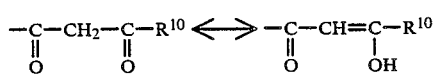

wherein $R^{10}$ is substituted or unsubstituted alkyl or aryl containing groups, with the proviso that at least one of the A' or A" groups comprises said tautomeric substituent.

Specifically, $R^1$ and $R^5$ groups may be the same or different and may be olefinic polymeric residues produced from $C_2$ to $C_{10}$ monoolefins. Such olefins may be ethylene, propylene, butylene, isobutylene, pentene, octene-1, styene, etc. The polymers can be homopolymers such as polyisobutylene, as well as copolymers or two or more of such olefins such as copolymers of: ethylene and propylene; butylene and isobutylene; propylene and isobutylene; etc. Other copolymers are those in which a minor molar amount of the copolymer monomers, e.g., 1 to 10 mole %, is a $C_4$ to $C_{18}$ diolefin, e.g., a a copolymer of isobutylene and butadiene; or a copolymer of ethylene, propylene and 1,4-hexadiene; etc.

The olefin polymer may be completely saturated as in the example of an ethylene-propylene copolymer made by Ziegler-natta synthesis using hydrogen as a moderator to control molecular weight.

The olefinic polymer will usually have number average molecular weights within the range of about 650 and about 3,500, more usually between about 900 and about 2500. Particularly useful olefin polymers have number average molecular weights within the range of about 1300 and about 2200 with approximately one double bond per polymer chain. An especially useful starting material is polyisobutylene.

The $R^2$, $R^4$ and $R^6$ groups are alkylene linkages having from 1 to 6 carbon atoms (e.g., $-CH_2-$, $C_2H_4-$, $-C_3H_6-$ and $-C_4H_8-$). The preferred linkage is a $C_2$ to $C_4$ link. Most preferred is an ethylene linkage ($-C_2H_4-$).

Preferably, when $n^2$ is zero, the value of $n^1$ is from 1 to 5, $n^3$ is from 0 to 5, and $n^4$ is from 0 to 5, and the sum of integers $n^1$, $n^3$ and $n^4$ is preferably from 2 to 10, and more preferably from 3 to 7. When $n^2$ is not zero, preferably each $A^1$ is independently selected from H or A, and the value of $n^1$ is from 1 to 5, $n^2$ is from 1 to 3, $n^3$ is from 0 to 5, and the total of integers $n^1$, $n^2$ and $n^3$ is from 2 10, and more preferably from 3 to 7.

The $R^{10}$ group may be a substituted or unsubstituted alkyl or aryl containing group but desirably is a lower alkyl having 1 to 4 carbon atoms and preferably is a methyl group.

As noted above $T^1$ $T^2$ may be either secondary or tertiary amine-containing groups of the formula:

 (II)

or

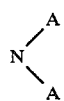 (III)

or polyolefin substituent succinimide-containing groups of the formula (IV):

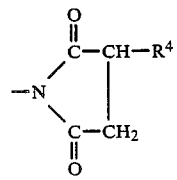

or a substituted or unsubstituted alkyl or aryl group, (e.g., $C_7$ to $C_{30}$ aralkyl and alkaryl) preferably an alktl group containing up to 25 carbon atoms.

Mixtures of adducts fitting the above description in which the molar ratio of adduct molecules having the amide substiruent to total adduct molecules (i.e., those having both the amide and the succinimide sunstituent) of from 0 to 1, are within the scope of the invention. More desirable are mixtures wherein such ratios are in the range of from about 0.0 to 0.5:1 and most desirable from about 0.0 to 0.05:1.

These adducts may be made in a variety of ways. Certain portions of the reaction scheme are belived to be important in producing the described molecule. Those steps will be highlighted at appropriate junctures.

The step in this process which produces the above adducts is the reaction of the alkyl acetoacetate:

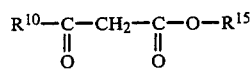 (V)

or an alkylthioacetate of the formula:

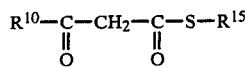 (VI)

(wherein $R^{10}$ is as defined above and $R^{15}$ may be H or substituted or unsubstituted alkyl or aryl containing sunstituent but preferably is a lower alkyl) with a long chain polyolefinic dicarboxylic acid which has been aminated with a polyamine. This reaction should be practiced at a temperature sufficiently high to produce sunstantial amounts of the tautomeric keto-enol rather than the enaminone.

Methods for producing the long chain polyolefinic dicarboxylic acid substrate (by reaction of olefin polymers with $C_4$ to $C_{10}$ unsaturated dicarboxylic acid, anhydride or ester) and the subsequent amination are known and are discussed below, in The Auxiliary Dispersant section of this application.

Such long chain polyolefinic dicarboxylic acid substrates can be illustrated by compounds of the formula:

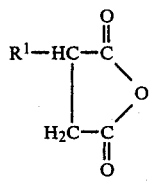 (VII)

wherein $R^1$ is as defined above, or the corresponding diacid

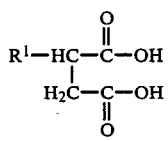 (VIII)

wherein $R^1$ is as defined above, or mixtured thereof.

Exemplary of amines employed are members, selected from the group consisting of compounds of the formulae (XI):

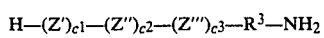

wherein Z' and Z" are the same or different and are moieties of the formula

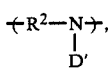,

Z" is a moiety of the formula:

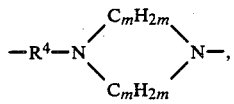, wherein $R^2$, $R^3$ and $R^4$ are the same or different and are alkylene of from 1 to 6 carbon atoms, m is an integer of from 1 to 5, each D' is independently selected from the group consisting of H and the moiety

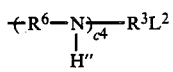

wherein $R^6$ is alkylidene of from 1 to 6 carbon atoms, $C^1$ is an integer of from 0 to 10, $c^2$ is an integer of from 0 to 10, $c^3$ is an integer of from 0 to 10, $c^4$ is an integer of from 0 to b 10, with the provisos that the sum of $c^1$, $c^2$, $c^3$ and $c^4$ is from 3 to 10, and the sum of $c^1$, $c^3$ and $c^4$ is at least 1.

The resulting aminated polyolefinic dicarboxylic acid substrated materials can be generically illustrated by the formula (X):

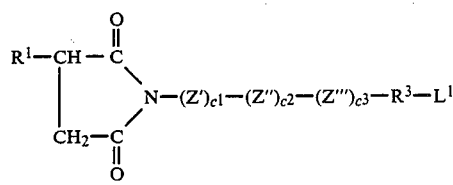

wherein Z' and Z''' are the same or different and are moieties of the formula:

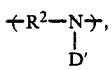,

Z" is a moiety of the formula:

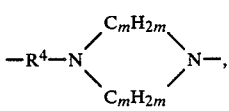, wherein $R^2$, and $R^3$ and $R^4$ are the same or different and are alkylidene of from 1 to 6 carbon atoms, m is an integer of from 1 to 5, each D' is independently selected from the group consisting of H and the moiety:

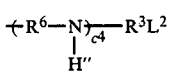

wherein $R^3$ is as defined above, $R^6$ is alkylidene of from 1 to 6 carbon atoms, $L^1$ and $L^2$ are the same or different and each comprises a member selected from the group consisting of moieties of the formula:

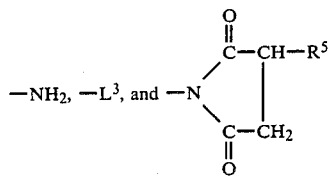

wherein $L^3$ is substituted or unsubstituted alkyl or aryl-containing group, $c^1$ is an integer of from 0 to 10, $c^2$ is an integer of from 0 to 10, $c^3$ is an integer of from 0 to 10, $c^4$ is an integer of from 0 to 10, with the proviso that the sum of $c^1$, $c^2$, $c^3$ and $c^4$ is from 3 to 10, and the sum of $c^1$, $c^3$ and $c^4$ is at least 1.

The resulting aminated polyolefinic dicarboxylic acid substrate materials prepared from polyalkylene polyamines can be illustrated by the general formulae:

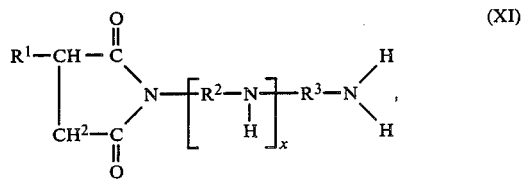

or

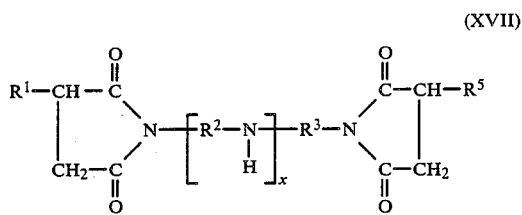

wherein x is an interger of form 1 to 10.

Typically, they will be produced in mixtures of the two.

The polyolefinic dicarboxylic acid substrate material after amination, is then reacted with an alkyl acetoacetate of the formula:

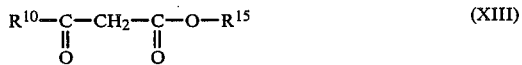

or an alkyl thioacetate of the formula:

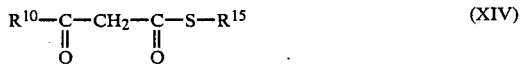

(wherein $R^{10}$ is as defined above and $R^{15}$ may be H or a substituted or unsubstituted alkyl or aryl group that preferably is alkyl having 1 to 6 carbons) most preferably at a temperature sufficiently high so to substantially minimize the production of the enaminone and produce, instead, the keto-enol tautomer. Temperatures of at least about 150° C. are preferred to meet this goal although proper choice of temperature depends on many factors, including reactants, concentration, reaction solvent choice, etc. Temperatures of from about 120° to 220° C., preferably from about 150° C. to 180° C. will generally be used. The reaction of the animated poly- olefinic dicarboxylic acid material and the alkyl acetonate and the alkyl thioacetate will liberate the corresponding $HOR^{15}$ and $HRS^{15}$ by-products, respectively. Preferably, such by-products are substantially removed, as by distillation or stripping with an inert gas (such as $N_2$), prior to use of the adduct as described herein. Such distillation and stripping steps are conveniently performed at elevated temperature, e.g., at the selected reaction temperature (for example, at 150° C. or higher).

The amount of alkyl aceto-acetate and/or alkyl thioacetate reactants used can vary widely, and is preferably selected so as to avoid substantial excesses of these reactants. Generally, these reactants are used in a reactant:amine nitroge-equivalent molar ratio of from about 0.1 to 1:1, and preferably from about 0.5 to 1:1, wherein the moles of amine nitrogen-equivalent is the moles of secondary nitrogens plus twice the moles of primary nitrogens in the animated polyolefinic dicarboxylic acid material (e.g., PIBSA-PAM) which is thus contacted with the alkyl acetonate or alkyl thioacetate. The reaction should also be conducted in the substantial absence of strong acids (e.g., mineral acids, such as HCl, $HB_2$, $H_2SO_4$, $H_3PO_3$ and the like, and sulfonic acids, such as para-toluene sulfonic acids) to avoid the undesired side-reactions and decrease in yield to the adducts of this invention.

An alternative method of synthesizing the inventive adduct is one in which, in a first step, the above-noted amine compounds are first reacted with the listed alkyl acetoacetates or alkyl thioacetate. The resulting material, in a second step, may then be reacted with the polyolefinic dicarboxylic acid material. The first step may be done by simply mixing the reactant amines and alkyl acetoacetates at a temperature of from about 120° to 220° C., preferably at least about 150° C., more preferably 120° C. to 180° C. to form an amino compound substituted by at least one tautomeric substituent of the formula (Ia):

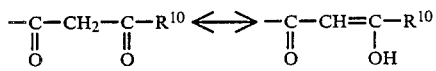

wherein $R^{10}$ is defined above.

A neutral diluent such as mineral oil may be used but is not needed. The second step desirably takes place in a neutral diluent such as mineral oil at a temperature between 100° C. and 230° C. The temperature is not particularly critical but takes place at a higher rate at the higher temperature range, e.g., at least about 150° C. As in the first above-metioned method, it is preferable to distil and/or use inert gas stripping (e.g., with $N_2$), at elevated temperatures, to substantially remove by-product $HOR^{15}$ or $HSR^{15}$ from the amine-alky acetoacetate (or alkyl thioacetate) reaction mixture, and the reaction should be conducted in the substantial absence of strong acids. The amount of amine and alkyl acetoacetate (or alkyl thioacetate) so contacted for reaction will generally be from about 0.1 to less than 1.0, and preferably from about 0.5 to 0.8, moles of the alkyl acetoacetate (alkyl thiocetate) per nitrogen-equivalent of the amine (the sum of the moles of the amine's secondary N atom + twice the amine's primary N atoms).

The adducts of this invention may be treated by boration as generally taught in U.S. Pat. Nos. 3,087,936 and 3,245,024 (which are incorporated by reference). This is accomplished by treating the adduct with a boron compound selected from boron oxdide, boron halides, boron acids, and esters of boron acids in an amount sufficient to provide from about 0.1 to about 20 atomic proportion of boron for each mole of adduct. Desirably those proportions will be from 0.05 to 2.0 weight percent, e.g., 0.05 to 0.7 weight percent, boron based or the total weight of the adduct.

Treating may be carried out by adding from about 0.5 to 4 weight percent of the boron compound (preferably boric acid) to the adduct and heating while stirring between 135° C. to 190° C. The time of reaction may be 1 to 5 hours. Nitrogen stripping may be used during or after the reaction.

Exemplary of adducts of this invention derived from cyclic alkylene polyamines are adducts of the formula I wherein $n^1$, $n^2$ and $n^3$ are each integers of 1 to 3, $R^2$ and $R^4$ are each $C_2$ to $C_4$ alkylene, A' is A, $n^4$ is an integer of 1 to 3, $R^3$ is $CH_2CH_2$—, $T^1$ is

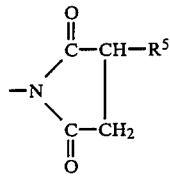

or —NH(A), A is the tautomeric substituent of the formula IXg wherein $R^{10}$ is $C_1$ to $C_2$ alkyl, and wherein $R^1$ and $R^5$ are the same or different and are polyalkylene (especially, polyisobutylene or polybutylene) having $\overline{M}n$ of from 1,500 to 3,000. Illustrative such adducts are those of the formula (XV):

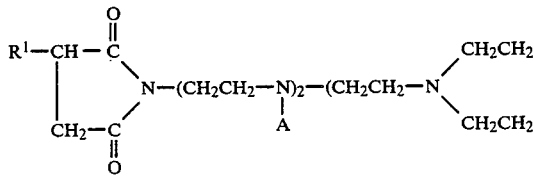

wherein $R^1$, $R^5$ and A are as defined in the prior sentence.

Exemplary of adducts or this invention derived from straight and branched chain polyalkylene polyamines are adducts of formula I wherein $n^2$ is zero, $n^1$ and $n^3$ are each integers of from 1 to 3, $R^2$ is $C_2$ to $C_4$ alkylene, each A' is:

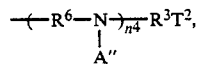

$R^3$ is —$CH_2CH_2$—, $n^4$ is an integer of 1 to 3, $R^6$ is $C_2$ to $C_4$ alkylene, $T^1$ and $T^2$ are as defined in formula IX, A is the tautomeric substituent of formula (Ia) wherein $R^{10}$ is $C_1$ to $C_2$ alkyl, and $R^1$ and $R^5$ are the same or different and the polyalkylene having $\overline{M}n$ of from 1,500 to 3,000. Exemplary of adducts derived from such branched chain polyalkylene polyamines are adducts of the formula (XVI):

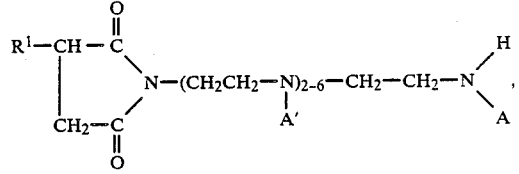

wherein A' is:

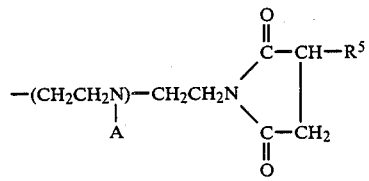

wherein $R^1$, A and $R^5$ are as defined in the piror sentence. Exemplary of adducts derived from straight chain polyalkylene polyamines are adducts of formula (I) wherein A' is H or A.

Adducts of this invention derived from straight chain polyalkylene polyamines are preferred.

Exemplary of preferred compatibilizer adducts of this invention are:

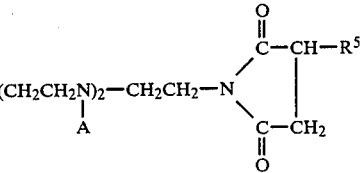
(XVII)

wherein A' is A, and wherein $R^1$, $R^2$, $R^3$, and $T^1$ as defined in Table I below:

TABLE I

| $R^1$ | x | $R^2$ | $R^3$ | $R^{10}$ of Each A(1) | $T^1$ |
|---|---|---|---|---|---|
| Derived from: | | | | | |
| polyisobutylene $M_n = 700$ | 5 | —$C_2H_4$— | —$CH_2CH_2$— | —$CH_3$ | —NH(A), $R^{10}$ = —$CH_3$ |
| polyisobutylene $M_n = 2,200$ | 3 | —$CH_2$— | —$C_3H_6$— | —$C_2H_5$ | —NH(A), $R^{10}$ = —$CH_3$ |
| polybutene $M_n = 1,200$ | 4 | —$C_5H_{10}$— | —$C_4H_8$— | —H | —NH(A)$_2$, $R^{10}$ = —H |
| polybutene $M_n = 4,000$ | 2 | —$C_2H_4$— | —$C_2H_4$— | —$C_2H_5$ | —NH(A)$_2$, $R^{10}$ = —$C_2H_5$ |
| polypentene | 5 | —$C_3H_6$— | —$C_3H_6$— | —$C_4H_9$ | —N(A)$_2$, |

TABLE I-continued

| $R^1$ | x | $R^2$ | $R^3$ | $R^{10}$ of Each A(1) | $T^1$ |
|---|---|---|---|---|---|
| $\overline{M}_n = 1,800$ | | | | | $R^{10} = -C_4H_9$ |
| ethylene-propylene co-polymer $\overline{M}_n = 1,500$ | 2 | $-C_2H_4-$ | $-C_2H_4-$ | $-CH_3-$ | $-N\begin{array}{c}H\\ \diagdown\\ A\end{array}$, $R^{10} = -CH_3$ |
| polyisobutylene $\overline{M}_n = 1,500$ | 2 | $-C_2H_4-$ | $-C_2H_4-$ | $-CH_3$ | (2) |

Notes:
(1) Wherein A = the tautomeric substituent of formula IXb.

(2) $T^1 = -N\begin{array}{c}C(O)-CH-R^5\\ |\\ C(O)-CH_2\end{array}$ wherein $R^5$ = polyisobutylene, $\overline{M}_n = 1,500$

AUXILIARY DISPERSANT

The auxiliary dispersants which may be used in this inventive composition comprise nitrogen or ester containing dispersants useful in this invention comprise nitrogen or ester containing dispersants selected from the group consisting of (i) oil soluble salts, amides, imides, oxazolines and esters, or mixtures thereof, of long chain hydrocarbon subsitiuted mono and dicarboxylic acids or their anhydrides; (ii) long chain aliphatic hydrocarbon having a polyamine attached directly thereto; and (iii) Mannich condensation products formed by condensing about a molar proportion of a long chain substituted phenol with about 1 to 2.5 moles of formaldehyde and about 0.5 to 2 moles of polyalkylene polyamine; wherein said long chain hydrocarbon group in (i), (ii) and (iii) is a polymer of a $C_2$ to $C_{10}$, e.g., $C_2$ to $C_5$, monoolefin, said polymer having a number average molecular weight of about 300 to 5000.

A(i) The long chain hydrocarbyl substituted mono- or dicarboxylic acid material, i.e. acid, anhydride, or ester, used in the invention includes long chain hydrocarbon, generally a polyolefin, substituted with an average of at least about 3.8, generally form about 1.0 to 2.0, preferably 1.05 to 1.4, more preferably 1.1 to 1.30, per mole of polyolefin, of an alpha or beta unsaturated $C_4$ to $C_{10}$ dicarboxylic acid, or anhydride or ester thereof, such as fumaric acid, itaconic acid, maleic acid, maleic anhydride, chloromaleic acid, dimethyl fumarate, chloromaleic anhydride, acrylic acid, methacrylic acid, crotonic acid, cinnamic acid, and mixtures thereof, is a long chain hydrocarbyl substituted dicarboxylic acid material i.e., acid anhydride, or ester, and includes a long chain hydrocarbon, generally a polyolefin, sunstituted with an alpha or beta unsaturated $C_4$ to $C_{10}$ dicarboxylic acids, itaconic acid, maleic acid, maleic anhydride, chloromaleic acid, dimethyl furmarate, chloromaleic anhydride, etc., per mole of polyolefin. Preferably the molar ratio of dicarboxylic acid to polyolefin is at least 1.05.

Preferred olefin polymers for the reaction with the unsaturated dicarboxylic acids are those polymers made up of a major molar amount of $C_2$ to $C_{10}$, e.g., $C_2$ to $C_5$, monoolene. Such olefins include ethylene, propylene butylene, isobutylene, pentene, octene-1, styrene, etc. The polymers may be homopolymers such as polyisobutylene or copolymers of two or more of such olefins. These include copolymers of: ethylene and propylene; butylene and isobutylene; propylene and isobutylene; etc. Other copolymers include those in which a minor molar amount of the copolymer monomers, e.g., 1 to 10 mole percent is a $C_4$ to $C_{18}$ diolefin, e.g., copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers will usually have number average molecular weights above about 1,500. Particularly useful olefin polymers have number average molecular weights within the range of about 1,500 and about 5,000 with approximately one terminal double bond per polymer chain. An especially suitable starting material for a dispersant additive in polyisobutylene. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

Processes of reacting the olefin polymer with the $C_{4-10}$ unsaturated dicarboxylic acid, anhydride or ester are known in the art. For example, the olefin polymer and the dicarboxylic acid material may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8, preferably 3 to 7 weight percent chlorine, or bromine based on the weight of polymer, by passing the chlorine or bromine through the polyolefin at a temperature of 60° to 250° C., e.g., 120° to 160° C. for about 0.5 to 10, preferably 1 to 7 hours. The halogenated polymer may then be reacted with sufficient unsturated acid or anhydride at 100° to 250°, usually about 180° to 220° C. for about 0.5 to 10, e.g., 3 to 8 hours. Processes of this general type are taught in U.S. Pat. Nos. 3,087,436; 3,172,892; 3,272,746 and others.

Alternatively, the olefin polymer, and the unsaturated acid material are mixed and heated while adding chlorine to the hot material. Processes of this type are disclosed in U.S. Pat. Nos. 3,215,707; 3,231,587;

3,912,764; 4,110,349; 4,234,435; and in U.K. No. 1,440,219.

By the use of halogen, about 65 to 95 weight percent of the polyolefin will normally react with the dicarboxylic acid material. Thermal reactions, those carried out without the use of halogen or a catalyst, cause only about 50 to 75 weight percent of the polyisobutylene to react. Chlorination obviously helps to increase the reactivity. For convenience, all of the aforesaid functionality ratios of dicarboxylic acid producing units to polyolefin, e.g., 1.0 to 2.0, etc., are based upon the total amount of polyolefin, that is, the total of both the reacted and unreacted polyolefin, present in the resulting product formed in the aforesaid reactions.

The dicarboxylic acid producing materials can also be further reacted with amine, alcohols, including polyols, amino-alcohols, etc., to form other useful dispersant additives. Thus, if the acid producing material is to be further reacted, e.g., neutralized, then generally a major proportion of at least 50 percent of the acid units up to all the acid units will be reacted.

Useful amine compounds for neutralization of the hydrocarbyl substituted dicarboxylic acid material include mono- and polyamines of about 2 to 60, e.g., 3 to 20, total carbon atoms and about 1 to 12, e.g., 2 to 8 nitrogen atoms in the molecule. These amines may be hydrocarbyl amines or may be hydrocarbyl amines including other groups, e.g., hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines, including those of the general formulas:

   (XVIII)

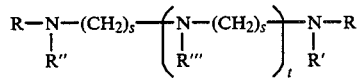   (XIX)

wherein R, R', R" and R'" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ alkyl-amino $C_2$ to $C_6$ alkylene radicals; and wherein R'" can additionally comprise a moiety of the formula:

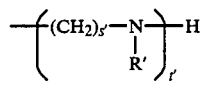   (XX)

wherein R' is as defined above, and wherein each s and s' can be the same or a different number of from 2 to 6, preferable 2 to 4; and t and t' can be the same or different and each numbers of from 0 to 10, preferably 2 to 7 with the proviso that the sum of t and t' is not greater than 10. To assure a facile reaction, it is preferred that R, R', R", R'",s, s', t and t' be selected in a manner sufficient to provide the compounds of Formulas XVIII and XIX with typically at least one primary or secondary amine groups. This can be achieved by selecting at least one of said R, R', R" or R'" groups of to be hydrogen on by letting t in Formula Ib be at least one when R'" is H or when the (XXI) moiety possesses a secondary amino group. The most preferred amine of the above formulas are represented by Formula XIX and contain at least two primary amine groups and at least one, and preferably at least three, secondary amine groups.

Non-limiting examples of suitable amine compounds include: 1,2-diaminoethane; 3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di(1,3-propylene)triamine; N,N-dimethyl-1,-3-diaminopropane; N,N-di(2-aminoethyl)ethylene diamine; N,N-di(2-hydroxyethyl)-1,3-propylene diamine; 3-dodecyloxy-propylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl)morpholine; etc.

Other useful amine compounds include: alicyclic diamines such as 1,4-di(aminomethyl) cylohexane, and heterocylic nitrogen compounds such as imidazolines, and N-aminoalkyl piperazines of the general formula (XXI):

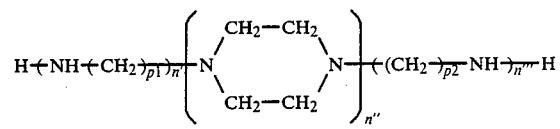

wherein $p_1$ and $p_2$ are the same or different and are each integers of from 1 to 4, and n', n" n'" are the same or different and are each integers of form 1 to 3. Non-limiting examples of such amines include 2-pentadecyl imidazoline; N-(2-aminoethyl) piperazine; etc.

Commercial mixtures of amines compounds may advantageously be used. For example, one process for preparing alkylene amines involes the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and corresponding piperazines. Low cost poly (ethyleneamine) compounds averaging about 5 to 7 nitrogen atoms per molecular are available commercially under trade names such as "Polyamine H", "Polyamine 400","Dow Polyamine E-100", etc.

Useful amines also include polyoxyalkylene polyamines such as those of the formulae:

(i)

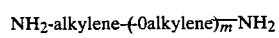   (XXII)

where m has a value of about 3 to 70 and preferably 10 to 35, and:

(ii)

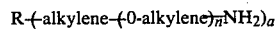   (XXIII)

where "n" has a value of about 1 to 40 with the provision that the sum of all the n's is from about 3 to about 70 and preferably from about 6 to about 35 and R is a polyvalent saturated hydrocarbon racial of up to ten carbon atoms wherein the number of substituents on the R group is represented by the value of "a", which is a number from 3 to 6. The alkylene groups in either formula (XXII) or (XXIII) may be straight or branched chains containing about 2 to 7, and preferably about 2 to 4 carbon atoms.

The polyoxyalkylene polyamines above, preferably polyoxyalkylene diamines and polyoxyalkylene triamines, may have average molecular weights ranging from about 200 to 4,000 and preferably from about 400 to about 2,000. The preferred polyoxyalkylene polyamines include the polyoxyethylene and polyoxyalkylene polyamines include the polyoxyethene and polyoxypropylene diamines include the polyoxypropylene triamines having average molecular weights ranging from about 200 to 2,000. The polyoxyalkylene polyamines are commercially available and may be obtained, for example, from the Jefferson Chemical Company, Inc., under the trade name "Jeffamines D-230, D-400, D-1000, D-2000, T-403", etc.

The amine is readily reacted with the dicarboxylic acid material, e.g., alkenyl succinic anhydride, by heating an oil solution containing 5 to 95 weight percent of dicarboxylic acid material to about 100° C. to 250° C., preferably 125° C. to 175° C., generally for 1 to 10, e.g., 2 to 6 hours, until the desired amount of water is removed. The heating is preferably carried out to favor formation of imides or mixtures of imides and amides, rather than amides and salts.

Reaction ratios of dicarboxylic acid material to equivalents of amine as well as the other nucleophilic reactants described herein can vary considerably, depending upon the reactants and type of bonds formed. Generally from 0.1 to 1.0, preferably about 0.2 to 0.6, e.g., 0.4 to 0.6, moles of dicarboxylic acid moiety content (e.g. grafted maleic anhydride content) is used, per equivalent of nucleophilic reactant, e.g. amine. For example, about 0.8 mole of a pentamine (having two primary amino groups and 5 equivalents of nitrogen per molecule) is preferably used to convert into a mixture of amides and imides, the product formed by reacting one mole of olefin with sufficient maleic anhydride to add 1.6 moles of succinic anhydride groups per mole of olefin, i.e. preferably the pentamine is used in an amount sufficient to provide about 0.4 mole (that is $1.6 \div [0.8 \times 5]$ mole) of succinic anhydride moiety per nitrogen equivalent of the amine.

The nitrogen-containing dispersant can be further treated by boration as generally taught in U.S. Pat. Nos. 3,087,936 and 3,254,025 (the entirety of which is incorporated by reference). This is readily accomplished by treating said acyl nitrogen dispersant with a boron compound selected from the class consisting of boron oxide, boron halides, boron acids and esters of boron acids in an amount to provide from about 0.1 atomic proportion of boron for each mole of said acylated nitrogen composition to about 20 atomic proportions of boron for each atomic proportions of nitrogen of said acylated nitrogen composition. Usefully the dispersants of the inventive combination contain from about 0.05 to 2.0 weight percent, e.g., 0.05 to 0.7 weight percent, boron based on the total weight of said borated acyl nitrogen compound. The boron, which appears to be in the product as dehydrated boric acid polymer (primarily $(HBO_2)_3$), is believed to attach to the dispersant imides and diimides as amine salts, e.g., the metaborate salt of said diimide.

Treating is readily carried out by adding from about 0.05 to 4, e.g., 1 to 3 weight percent (based on the weight of said acyl nitrogen compound) of said boron compound, preferably boric acid which is most usually added as a slurry to said acyl nitrogen compound and heating with stirring at from about 135° C. to 190° C., e.g., 140° C. to 170° C., for from 1 to 5 hours followed by nitrogen stripping at said temperature ranges. Or, the boron treatment can be carried out by adding boric acid to the hot reaction mixture of the dicarboxylic acid material and amine while removing water.

Tris (hydroxymethyl) amino methane (THAM) can be reacted with the aforesaid acid material to form amides, imides or ester type additives as taught by U.K. No. 984,409, or to form oxazoline compounds and borated oxazoline compounds as described, for example, in U.S. Pat. Nos. 4,102,798; 4,116,876; and 4,113,639.

The ashless dispersants may also be esters derived from the long chain hydrocarbyl substituted dicarboxylic acid material and from hydroxy compounds such a monohydric and polyhydric alcohols or aromatic compounds such as phenols and naphthols, etc. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, mono-oleate of glycerol, monostearate of glycerol, monomethyl ether of glycerol, pentaerythritol, dipentaerythritol, and mixtures thereof.

The ester dispersant may also be derived from unsaturated alcohol such as allyl alcohol, cinnamyl-alcohol, propargyl alcohol, 1-cyclohexane-3-ol, and oleyl alcohol. Still other classes of the alcohols capable of yielding the esters of this invention comprise the ether-alcohols and amino-alcohols including, for example, the oxy-alkylene-, oxy-arylene-, amino-alkylene-, and amino-arylene-substituted alcohols having one or more oxy-alkylene, amino-alkylene or amino-arylene oxy-arylene radicals. They are exemplified by Cellosolve, Carbitiol, N,N,N',N'-tetrahydroxy-trimethylene diamine, and ether-elcohols having up to about 150 oxy-alkylene radicals in which the alkylene radical contains from 1 to about 8 carbon atoms.

The ester dispersant may be di-esters of succinic acids or acidic esters, i.e., partially esterified succinic acids; as well as partially esterified polyhydric alcohols or phenols, i.e., esters having free alcohols or phenolic hydroxyl radicals. Mixtures of the above illustrated esters likewise are contemplated within the scope of this invention.

The ester dispersant may be prepared by one of several known methods as illustrated for example in U.S. Pat. No. 3,381,022.

Hydroxyamines which can be reacted with the long chain hydrocarbon substituted dicarboxylic acid material mentioned above to form dispersants include: 2-amino-1-butanol; 2-amino-2-methyl-1-propanol; p-(beta-hydroxy-ethyl)-aniline; amino-1-propanol; a-amino-1-propanol, 2-amino-2-methyl-1,3-propane-diol; 2-amino-2-ethyl-1,3-propanediol; N-(beta-hydroxypropyl)-N'-(beta-amino-ethyl)-piperazine; tris (hydroxymethyl)amino-methane (also known as trismethylolaminomethane); ethanolamine; beta-(beta-hydroxy-ethoxy)-ethylamine; and like. Mixtures of these or similar amines can also be employed.

A very suitable ashless dispersant is one derived from polyisobutylene substituted with succinic anhydride groups and reacted with polyethylene amines, e.g., tetraethylene pentamine, pentaethylene hexamine, polyoxyethylene and polyoxypropylene amines, e.g., polyoxypropylene diamine, trismethlolaminomethane and pentaerythritol, and combinations thereof. One preferred disperant combination involves a combination of (A) polyisobutene substituted with succinic anhydride groups and reacted with (B) a hydroxy compound, e.g., pentaerythritiol, (C) a polyoxyalkylene polyamine, e.g., polyoxypropylene diamine, (D) a polyalkylene polyamine, e.g., polyethylene diamine and tetraethylene pentamine using about 0.3 to about 2 moles each of (B) and (D) and about 0.3 to about 2 moles of (C) per mole of (A) as described in U.S. Pat. No. 3,804,763. Another preferred dispersant combination involves the combination of (A) polyisobutenyl succinic anhydride with (B) a polyalkylene polyamine, e.g., tetraethylene pentamine, and (C) a polyhdric alcohol or polyhydroxy-substituted aliphatic primary amine, e.g., pentaerythritol or trismethylol-aminomethane as described in U.S. Pat. No. 3,632,511.

A(ii) Also useful as ashless nitrogen-containing dispersant in this invention are dispersants wherein a nitrogen containing polyamine is attached directly to the long chain aliphatic hydrocarbon as shown in U.S. Pat. Nos. 3,275,554 and 3,565,804 where the halogen group on the halogenated hydrocarbon is displaced with various alkylene polyamines.

A(ii) Another class of nitrogen containing dispersants which may be used are those containing Mannich base or Mannich condensation products as they are known in the art. Such Mannich condensation products generally are prepared by condensing about 1 mole of a high molecular weight hydrocarbyl substituted mono- or polyhydroxy benzene (e.g., having a number average molecular weight of 1,000 or greater) with about 1 to 2.5 moles of formaldehyde or paraformaldehyde and about 0.5 to 2 moles polyalkylene polyamine as disclosed, e.g., in U.S. Pat. Nos. 3,442,808; 3,649,229 and 3,798,165 (the disclosures which are hereby incorporated by reference in their entirety). Such Mannich condensation products may include a long chain, high molecular weight hydrocarbon on the phenonl group or may be reacted with a compound containing such a hydrocarbon, e.g., polyalkenyl succinic anhydride as shown in said aforementioned '808.

DETERGENTS

Metal-containing rust inhibitors and/or detergents are frequently used with ashless dispersants. Such detergents and rust inhibitors include the metal salts of sulfonic acids, alkyl phenols, sulfurized alkyl phenols, alkyl salicylates, naptheneates, and other oil soluble mono-and di-carboxylic acids. Highly basic (or "overbased") metal salts, which are frequently used as detergents, appear particularly prone to interaction with the ashless dispersant. Usually these metal-containing rust inhibitors and detergents are used in lubricating oil in amounts of about 0.01 to 10, e.g., 0.1 to 5, weight percent, based on the weight of the total lubricating composition.

Highly basic alkaline earth metal sulfonates are frequently used as detergents. They are usually produced by heating a mixture comprising an oil-soluble sulfonate or alkaryl sulfonic acid, with an excess of alkaline earth metal compound above that required for complete neutralization of any sulfonic acid present and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, napthalene, diphenyl and the halogen derivatives such as chlorobenzen, chlorotoluene and chloronaphthalene. The alkylation may be carried out in the presence of a catalyst with alkylating agents having from about 3 to more than 30 carbon atoms. For example, haloparaffins, olefins obtained by dehydrogenation of paraffins, polyolefin polymers produced from ethylene, propylene, etc., are all suitable. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, strontium and barium. Examples are calcium oxide, calcium hydroxide, magnesium oxide, magnesium acetate and magnesium borate. As noted, the alkaline earth metal compound is used in excess of that required to complete neutralization of the alkaryl sulfonic acids. Generally, the amount ranges from about 100 to 220 percent, although it is preferred to use at least 125 percent, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

A preferred alkaline earth sulfonate additive is magnesium alkyl aromatic sulfonate having a high total base number ("TBN") ranging from about 300 to about 400 with the magnesium sulfonate content ranging from about 25 to about 32 weight percent, based upon the total weight of the additive system dispersed in mineral lubricating oil.

Neutral metal sulfonates are frequently used as rust inhibitors. Polyvalent metal alkyl salicylate and naphthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and naphthenates can be realized by utilizing alkaline earth metal, e.g., calcium, salts of mixtures of $C_8$–$C_{26}$ alkyl salicylates and phenates (see '069) or polyvalent metal salts of alkyl salicyclic acids, said acids obtained from the alkylation of phenols followed by phenation, carboxylation and hydrolysis (U.S. Pat. No. 3,704,315) which could then be converted into highly basic salts by techniques generally known and used for such conversion. The reserve basicity of these metal containing rust inhibitors is usefully at TBN levels of between 60 and 150. Included with the useful polyvalent metal salicylate and naphthenate materials are the methylene and sulfur bridged materials which are readily derived from alkyl substituted salicylic or napthenic acids or mixtures of either of both with alkyl substituted phenols. Basic sulfurized salicylates and a method for their preparation is shown in U.S. Pat. No. 3,595,791. Such materials include alkyline earth metal, particularly magnesium, calcium, strontium and barium salts of aromatic acids having the general formula:

HOOC—ArR'—X'y(ArR'OH)$_n$ where Ar is an aryl radical of 1 to 6 rings, R' is an alkyl group having from about 8 to 50 carbon atoms, preferably 12 to 30 carbon atoms (optimally about 12), X' is a sulfur (—S—) or methylene (—CH$_2$—) bridge, y is a number from 0 to 4, and n is a number of from 0 to 4.

Preparation of the overbased methylene bridged salicylate-phenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt of a methylene bridged phenol-salicylic acid of the general formula:

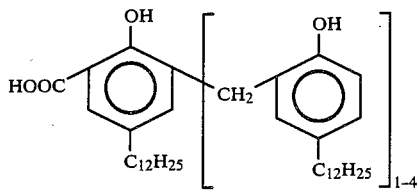

with a TBN of 60 to 150 is highly useful in this invention.

The sulfurized metal phenates can be considered the "metal salt of a phenol sulfide" which thus refers to a metal salt whether neutral or basic, of a compound typified by the general formula:

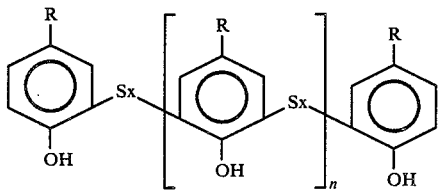

where x=1 or 2, n=0, 1 or 2; or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14 percent by weight preferably about 4 to about 12 weight percent sulfur based on the weight of sulfurized alkyl phenol.

The sulfurized alkyl phenol may be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichometric, e.g., basic sulfurized metal dodecyl phenate has a metal content up to (or greater) than 100 percent in excess of the metal present in the corresponding normal sulfurized metal phenates. The excess metal is produced in oil-soluble or dispersible form (as by reaction with $CO_2$).

ANTIWEAR ADDITIVES

Dihydrocarbyl dithiophosphate metal salts are frequently added to lubricating oil compositions as antiwear agents. They also provide antioxidant activity. The zinc salts are most commonly used in lubricating oil in amounts of 0.1 to 10, preferably 0.2 to 2 weight percent, based upon the total weight of the lubricating oil composition. They may be prepared in accordance with known techniques by first forming a dithiophosphoric acid, usually by reaction of an alcohol or a phenol with $P_2P_5$ and then neutralizing the dithiophosphoric acid with a suitable zinc compound.

Mixtures of alcohols may be used including mixtures of primary and secondary alcohols, secondary generally for importing improved antiwear properties, with primary giving improved thermal stability properties. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates useful in the present invention are oil soluble salts of dihydrocarbyl esters of dithiophosphoric acids and may be represented by the following formula:

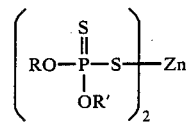

wherein R and R' may be the same or different and are hydrocarbyl radicals containing from 1 to 18, preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R') in the dithiophosphoric acid generally should be about 5 or greater.

ANTIOXIDANTS

Materials which have been observed to be effective antioxidants in lubricating oil compositions are oil-soluble copper compounds, e.g., synthetic or natural carboxylic acid Cu salts. Examples include $C_{10}$ to $C_{18}$ fatty acids such as stearic or palmitic acid. But unsaturated acids (such as oleic acid), branched carboxylic acids (such as napthenic acids) of molecular weight from 200 to 500 and, synthetic carboxylic acids are all used because of the acceptable handling and solubility properties of the resulting copper carboxylates.

Suitable oil soluble dithiocarbamates have the general formula $(R_{11} R_{12} N C SS)_n Cu$; where n is 1 or 2 and $R_{11}$ and $R_{12}$ may be the same or different and are hydrocarbyl radicals containing from 1 to 18 carbon atoms and including radicals such as alkyl, alkenyl, aryl, aralkyl, alkaryl and cycloaliphatic radicals. Particularly preferred as $R_{11}$ and $R_{12}$ groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethyl-hexyl, phenyl, butyl-phenyl, cyclohexyl, methylcyclopentyl, propenyl, butenyl, etc. In order to obtain oil solubility, the total number of carbon atoms (i.e., $R_{11}$ and $R_{12}$) generally should be about 5 or greater.

Copper sulfonates, phenates, and acetyl acetonates may also be used.

These antioxidants are used in amounts such that, in the final lubricating or fuel composition, a copper concentration of from about 1 to about 500 ppm is present to the ad pack mixture.

Lubricant Oil Basestock

The ashless dispersant, metal detergent, antiwear agent and compatibilizing material of the present invention will be generally used in admixture with a lube oil basestock, comprising an oil of lubricating viscosity, including natural and synthetic lubricating oils and mixtures thereof. The lubricating oil base stock conveniently has a viscosity of typically about 2.5 to about 12, and preferably about 2.5 to about 9 cs. at 100° C.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinates polybutylenes, poly(1-hexenes), poly(1-octenes), poly(1-decenes)); alkybenzenes (e.g., dodecyl-benzenes, tetradecylbenzenes, dinonylbenzenes, di(2-ethylhxyl)benzenes); polyphenyls (e.g., biphenyls, terphenyls, alkylated polyphenols); and alkylated diphenyl ethers and alkylated diphenyl sulfides and the derivatives, analogs and homologs thereof.

Alkylene oxide polymers and interpolymers and derivatives thereof where the terminal hydroxyl groups have been modified by esterification, etherification, etc., constitute another class of known synethetic lubricating oils. These are exemplified by polyoxyalylene polymers prepared by polymerization of ethylene oxide or propylene oxide, the alkyl and aryl ethers of these polyoxyalkylene polymers (e.g., methyl-polyisopropylene glycol ether having an average molecular weight of 1000, diphenyl ether of poly-ethylene glycol having a molecular weight of 500–1000, diethyl ether of polypropylene glycol having a molecular weight of 1000–1500); and mono- and polycarboxylic esters thereof, for example, the acetic acid esters, mixed $C_3$–$C_8$ fatty acid esters and $C_{13}$ Oxo acid diester of tetraethylene glycol.

Another suitable class of synthetic lubricating oil comprises the esters of dicarboxylic acids (e.g., phthalic acid, succinic acid, alkyl succinic acids and alkenyl succinic acids, maelic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxne oils and silicate oils comprise another useful class of synthetic lubricants; they include tetraethyl silicate, tetraisopropyl silicate, tetra-(2-ethylhexyl)silicate, tetra-(4methyl-2-ethylhexyl)silicate, tetra-(p-tert-butylphenyl)silicate, hexa-(4-methyl-2-pentoxy)disiloxane, poly(methyl)siloxanes and poly(methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filteration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

This invention is further illustrated by the examples which follow. The examples are not intended to limit the scope of the invention in any way.

PRODUCTION OF PIBSA-POLYAMINES

EXAMPLE 1

A polyisobutenyl succinic anhydride (PIBSA) having a ratio of 1.31 succinic anhydride (SA) moieties per polyisobutylene (PIB) molecule of 1300 $\overline{M}_n$ was prepared by heating a mixture of 100 parts of the PIB with 13 parts of maleic anhydride to a temperature of about 220° C. When the temperature reached 120° C., chlorine addition was begun and 105 g were added during a period of 5 hours. The reaction mixture was then heat soaked at 220° C. for about 1.5 hours and stripped with nitrogen for about one hour. The resulting PIBSA had a saponification number of 103. The PIBSA was diluted with mineral oil solvent 150 neutral. The diluted PIBSA analyzed for a saponification number of 70 and 59 wt. % active ingredient.

The PIBSA was aminated as follows: 2000 grams (1.3 moles) of the PIBSA and 860 grams of S150N lubricating oil were mixed in a reaction flask and heated to about 149° C. Then, 182 grams of tetraethylene-penetamine (TEPA) was added dropwise and the mixture was heated at 150° C. for three hours while nitrogen sparging. The product was filtered and found to have a nitrogen content of 2.04 wt. %.

EXAMPLE 2

A PIBSA having an SA:PIB ratio of 1.04 succinic anhydride (SA) moieties per polyisobutylene (PIB) molecules of 940 $\overline{M}_n$ was prepared by heating a mixture of 100 parts of PIB with 13 parts of maleic anhydride to a temperature of about 220° C. When the temperature reached 120° C., chlorine addition was begun and 10.5 parts of chlorine were added for a period of five hours. The reaction mixture was then soaked at 220° C. for about 1.5 hours and then stripped with nitrogen for about 1 hour. The resulting PIBSA had a SAP number of 112. The product was 90 weight percent active ingredient.

The product was aminated as follows: 900 parts of the PIBSA, 800 parts of toluene and 131 parts of TEPA was heated to azeotrope at 130° C. for 2 hours. The reaction mixture was heated to 150° C. while stripping the toluene with nitrogen for about 2 hours. The filtered product was found to have a nitrogen content of 4.29%. The product was diluted with S150N oil to produce a dilute mixture containing 2.12 wt. % N.

EXAMPLE 3

A mixture of 1298 parts by weight of the PIBSA starting material of Example 2, 1435 parts of mineral oil was heated to 150° C. Then, 161 parts of TEPA were added dropwise while stirring and light nitrogen sparging. The mixture was nitrogen stripped at 150° C. for 3 hours and then filtered. The oil solution was found to have a nitrogen content of 2.12 wt. %.

REACTION WITH ALKYL ACETOACETATE

EXAMPLE 4

About 152 parts by weight of the PIBSA-TEPA product from Example 1 and 6.5 parts of ethylacetoacetate were heated to 160° C. with reflux for 2 hours. The temperature was then raised to 180° C. while the by-product ethanol distilled off. The reaction product was stripped with nitrogen for one hour.

EXAMPLE 5

The procedure of Example 4 was again used except that 13 parts of ethylacetoacetate were added.

EXAMPLE 6

The procedure of Example 4 was again used except that 19.5 parts of ethylacetoacetate were added.

EXAMPLE 7

A mixture of 298 parts by weight of the material produced in Example 3 and 13 parts of ethylacetoacetate, and 8.4 parts of S150N oil was heated to 160° C. with reflux for 2 hours. The temperature was then raised to 180° C. while ethanol was distilled off. The reaction product was stripped with nitrogen for one hour.

EXAMPLE 8

The procedure as in Example 7 was again used except that 26 parts of ethylacetoacetate and 12.6 parts of S150N oil were added.

EXAMPLE 9

The procedure as in Example 7 was again used except that 39 parts of ethylacetoacetate and 25.2 parts of S150N oil were added.

COMPARATIVE EXAMPLES

The following examples were carried out to demonstrate that the activity of the products of the invention is due primarily to the chelating ability of the tautomeric keto-enol form of the inventive adduct molecule and not merely to the presence of high amide content.

EXAMPLE 10

About 149 parts by weight of the material of Example 3, 5.9 parts of acetic anhydride, and 2.8 parts of S150N oil were heated to 100° C. for 2 hours. The temperature was then raised to 200° C. and the product was stripped with nitrogen for 15 minutes. The product was then filtered.

EXAMPLE 11

The procedure of Example 8 was repeated except that 11.8 parts of acetic anhydride (in place of the alkyl acetoacetate) and 5.6 parts of S150N oil were added.

EXAMPLE 12

The same procedure of Example 8 was repeated except that 17.7 parts of acetic anhydride (in place of the alkyl acetoacetate) and 8.85 parts of S150N oil were added.

The mixtures of adducts with neutral oil found in inventive Examples 7, 8 and 9 (molar ratios of EAA/TEPA, respectively, 1:1, 2:1, 3:1) and Comparative Examples 10, 11 and 12 (molar ratios of acetic anhydride/TEPA, respectively, 1:1, 2:1, 3:1 ) were subjected to two bench tests—VIB (varnish inhibition test) and SIB (sludge inhibition test). The VIB test provides an indication of how well a formulation will inhibit varnish during operation of an engine using the formulation as a lubricant. Similarly, the SIB test gives a prediction of how well the formulation will inhibit the formation of sludge.

The SIB and VIB tests forecast the performance of a lubricant in a gasoline engine.

The SIB test employs a used crankcase mineral lubricating oil composition (having an original viscosity of about 325 SUS at 37.8° C.) which has been used in a taxicab driven generally only for short trips. This causes a buildup of sludge precursors. The oil used contains only a refined base material oil, a viscosity index improver, a pour point depressant and zinc dialkyldithiophosphate antiwear additives. The oil contains no sludge dispersants. Such oil is acquired by draining and refilling taxicab crankcases at about 1000–2000 mile intervals.

The SIB test is conducted in the following manner: the used crankcase oil is freed of sludge by centrifuging for one half hour at about 39,000 gravities (gs). The resulting clear bright red oil is then decanted from the separated insoluble particles. However, the supernatant oil still contains oil-soluble sludge precursors which (under the conditions employed by the SIB test) tend to form additional oil-insoluble deposits of sludge. The sludge inhibiting properties of the additive being tested is determined by adding to the used oil, 0.5 wt. % on an active basis, of the particular additive being tested. Ten grams of the sample tested is then placed in a stainless steel centrifuge tube and heated at 140° C. for 16 hours in the presence of air. Following the heating, the tube containing oil is cooled and centrifuged for 30 minutes at about 39,000 gs. Any deposits of new sludge that form in this step are separated from the decanting supernatant oil and then carefully washed with 15 ml. of pentane to remove all remaining oils. The weight of the new solid sludge that forms in the test in milligrams) is determined (after drying the residue) by weighing it. The results are reported as milligrams of sludge per ten grams of oil. Differences as small as one part per ten thousand can be measured. The less new sludge formed, obviously the more effective is the additive as a dispersant. In other words, if the additive is effective, it will maintain is suspension, during centrifugation, a portion of the new sludge that forms on heating and oxidation.

In the VIB test, a test sample consisting of ten grams of lubricating oil containing 0.5 wt. %, (on an active basis) of the additive being evaluated is used. The test oil is a lubricating oil obtained from a taxi which has been operated for about 2000 miles with the lubricating oil. The sample is heat soaked overnight at about 140° C. and thereafter centrifuged to remove the sludge. The supernatant fluid is subjected to heat cycling from about 150° C. to room temperature over a period of 3.5 hours at a frequency of about two cycles per minute. During the heating phase, a gas containing a mixture of 0.7 volume percent SO$_2$, 1.4 volume percent NO and the balance air is bubbled through the test sample; during the cooling phase, water vapor is bubbled through the sample. At the end of the test period, (which testing cycle can be repeated as necessary to determine the inhibiting effect of any additive,) the wall surfaces of the test flasks in which the samples are visually evaluated for varnish inhibition. The amount of varnish deposited on the walls is rated at values of from one to eleven with the higher number being the greater amount of varnish. This test also forecasts the varnish results obtained as a consequence of carrying out the ASTM MS-VD engine tests.

Table 1 shows the results of these comparative tests.

TABLE 1
REACTION WITH EAA VERSUS ACETIC ANHYDRIDE
BENCH TEST RESULTS

| DISPERSANT | EX. 7 | EX. 10 | EX. 8 | EX. 11 | EX. 9 | EX. 12 |
|---|---|---|---|---|---|---|
| EAA/PAM MOLAR RATIO (INVENTION) | 1 | — | 2 | — | 3 | — |
| AC$_2$O/PAM MOLAR RATIO (COMPARISON) | — | 1 | — | 2 | — | 3 |
| SIB (0 IS BEST) | 1.24 | 2.82 | 1.78 | 2.94 | 1.88 | 2.35 |
| VIB (1 IS BEST) | 5 | 7 | 5 | 9 | 6 | 9 |

Comparison of each of the pairs of formulations shows that, in each case, both the VIB and SIB test results of the inventive EAA adduct is superior to the acetic anhydride adduct. It is believed that the chelating ability of the inventive adduct EAA moiety, i.e.,

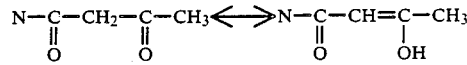

improves the SIB and VIB values.

The formulations of the inventive adducts (Examples 4, 5, and 6) and the PIBSA-TEPA of Example 1 were subjected to SIB and VIB tests. The results are shown in Table 2.

TABLE 2

| DISPERSANT | EAA:TEPA (MOLAR RATIO) | SIB | VIB |
|---|---|---|---|
| EX. 4 | 1 | 4.55 | 4 |
| EX. 5 | 2 | 3.95 | 4½ |
| EX. 6 | 3 | 0.0 | 4 |
| EX. 1 (Control) | 0 | 4.31 | 5½ |

In the series of SIB tests, as the EAA/TEPA ratios increases, the SIB value decreases to 0.0. The VIB value remains at a superior value. It is clear that the EAA provides the superior results when compared to the basic non-adduct PIBSA-TEPA.

PRE-REACTION OF EAA ADDUCTS

Several inventive PIBSA-PAM-EAA adducts were produced either by an alternative procedure in which the EAA was reacted with a polyamine (PAM) prior to reaction with the PIBSA or with the procedures exemplified above. These were compared to controls which were not adducts. The PIBSA-PAM materials were largely bis-succinimides.

EXAMPLE 13 PIBSA-PAM (1.84:1.0)

About 200 g (0.16 mole) of a PIBSA of a number average molecular weight of 1300 and a saponification number of 90.4 (90.5 active ingredient) was combined with 176 g of mineral oil S150N and heated to 150° C. while stirring under a nitrogen blanket. Then 16.7 g (0.087 mole) of a polyamine bottoms was added dropwise and the reaction mixture was heated at 150° C. for two hours; followed by 0.5 hour of nitrogen stripping. The product was filtered and had a viscosity of 225 cSt at 100° C. The resulting bis-succinimide analyzed for 1.46 wt. % N.

EXAMPLE 14

About 200 g (0.16 mole) of a PIBSA of a number average molecular weight of 1300 and a saponification number of 90.4 (90.5 active ingredient) was combined with 203 g of S150N mineral oil and heated to 150° C. while stirring under a nitrogen blanket. Then, 16.7 g (0.087 mole) of PAM was added dropwise and the reaction mixture was soaked at 150° C. for 2 hours. The mixture was stripped for 0.5 hour with nitrogen. Thereafter, 33.8 g (0.26 mole) of EAA was added and the reaction mixture was heated to 160° C. for two hours. The 50% oil solution was nitrogen stripped to remove ethanol for 0.5 hour and filtered. This product had a viscosity of 331 cSt at 100° C. and analyzed for 1.37 wt. % N.

EXAMPLE 15

About 33.8 g (0.26 mole) of EAA were mixed with 16.7 g (0.087 mole) of PAM and heated to 150° C. for 2 hours. The reaction mixture was nitrogen stripped to distill off the ethanol by-product. About 203 g of S150N mineral oil, and 200 g of a PIBSA made from a PIB having a $\overline{M}_n$ of 1300 and a saponification number of 90.4 (active ingredient 90.5%) were added and the mixture heated to 150° C. The reaction product was heat soaked at 150° C. for 2 hours with N$_2$ sparging and then filtered. This product has a viscosity of 419 cSt and contained 1.36 weight % N.

EXAMPLE 16

About 200 g (1.06 mole) of a PIBSA made from a PIB having a number average molecular weight of 1900 and a saponification number of 59.6 (78.9% active ingredient) was dissolved in 138.0 g S150N mineral oil and heated to 150° C. Then, 10.8 g (0.056 mole) of PAM was added dropwise. The reaction mixture was heated at 150° C. for 2 hours, followed by 0.5 hour of nitrogen stripping. The filtered 50% oil solution had a viscosity of 504 cSt and contained 1.05 wt. % N.

EXAMPLE 17

About 200 g of the PISBA employed in Example 13 was diluted with 151 g of S150N mineral oil and heated to 150° C. while stirring under a nitrogen blanket. Then, 10.8 g (0.056 mole) of PAM was added dropwise. The reaction mixture was heated at 150° C. for 2 hours while nitrogen sparging. Then, 21.8 g (0.16 mole) of EAA was added and the product heated at 150° C. for 2 hours, followed by 0.5 hour of nitrogen stripping to remove the ethanol formed. The 50% oil solution was filtered. This product had a viscosity of 800 cSt and analyzed for 0.99 wt. % N.

EXAMPLE 18

About 21.8 g (0.164 mole) of EAA and 10.8 g (0.056 mole) of PAM were mixed and heated to 150° C. for 2 hours. The ethanol was nitrogen stripped for 0.5 hour and the residue diluted with 151 g of S150N mineral oil. About 200 g (0.106 mole) of the PIBSA of Example 14 was added and the mixture was heated to 150° C. for 2 hours. The reaction product was then stripped with N$_2$ for 0.5 hour and filtered. The 50% oil solution had a viscosity of 994 cSt and analyzed for 0.99 wt. % N.

The materials produced in Examples 13 to 18 were subjected to VIB and SIB tests. The results are shown in Table 3.

TABLE 3

| EXAMPLE | SIB | VIB |
|---|---|---|
| 13 (Control) | 3.95 | 4 |
| 14 (Post-reacted) | 1.35 | 3 |
| 15 (Pre-reacted) | 2.19 | 3 |
| 16 (Control) | 3.43 | 5 |
| 17 (Post-reacted) | 2.15 | 4 |
| 18 (Pre-reacted) | 1.63 | 4 |

The SIB and VIB test results for the inventive composition are superior to the controls whether the compositions are made from pre-treated or post-reacted adducts.

BORATED PIBSA-PAM-EAA

Two samples of the inventive PIBSA-PAM-EAA were borated.

EXAMPLE 19

300 g of a PIBSA-PAM dispersant, based on a 950 $\overline{M}_n$ PIB and PIBSA to PAM molar ratio of 2.1:1, was charged in a reactor. The reactor was heated to 100° C. and 278.5 g of ethyl acetoacetate was added. The reactor was then heated soaked for 1 hour. The temperature was raised to 160° C. for 2 hours. The reactor was then sparged with N$_2$ to remove ethanol.

At 160° C., 68 g of boric acid was added slowly. The reaction was heat soaked for 2 hours with N$_2$ stripping. The product was filtered, and was found to contain 1.56 wt. % N and 0.391 wt. % boron.

EXAMPLE 20

3000 g of a PIBSA-PAM dispersant, based on a PIB $\overline{M}_n$ of 2250 and a PIBSA:PAM ratio of 1.9:1, was charged to reactor. The reator was heated to 100° C. and 178.1 g of EAA added. The reaction was heat soaked at 100° C. for 1 hour. The reaction was heated soaked at 160° C. for 2 hours and sparged with N$_2$ to remove ethanol.

At 165° C., 45 g of boric acid was added slowly with light N$_2$ stripping. After conclusion of the boric acid addition, the reactor was heat soaked for 2 hours. The product was filtered and was found to contain 0.98 wt. % N and 0.5 wt. % boron.

PRODUCTION OF ENAMINONE VERSUS THE INVENTIVE EAA ADDUCT

A model study was performed to show that the reaction temperature controlled the product produced by the synthesis procedure.

EXAMPLE 21

About 13.0 g (0.1 mole) of EAA was dissolved in 100 ml of anhydrous ether and 8.7 g (0.1 mole) of morpholine was added dropwise while keeping the reaction temperature at 20° C. Once the addition was completed, the reaction mixture was stirred at room temperature overnight. The ether was evaporated and the crude product analyzed. Proton NMR and C$^{13}$ NMR indicated the formation of the corresponding enaminone in quantitative yield according to the reaction.

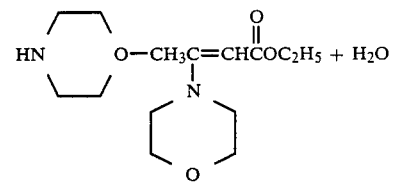

EXAMPLE 22

About 13.0 g (0.1 mole) of EAA and 8.7 g (0.1 mole) of morpholine were mixed in a reaction flask and heated to 120° C. for one hour. Thereafter the reaction temperature was raised to 180° C. allowing ethyl alcohol to distill off while the temperature rose to 180° C. About 4.5 g of a liquid which analyzed by GC to be ethanol was obtained by distillation. The residue was allowed to cool to room temperature and a solid was obtained. The crude yield of the solid was 16.1 g. The solid was recrystalized from ether and analyzed. The proton NMR showed no proton signals for the —O—CH$_2$CH$_3$ group. The structure of the morpholine of acetoacetic acid as a tautomeric form was confirmed via proton and carbon (C$^{13}$) NMR.

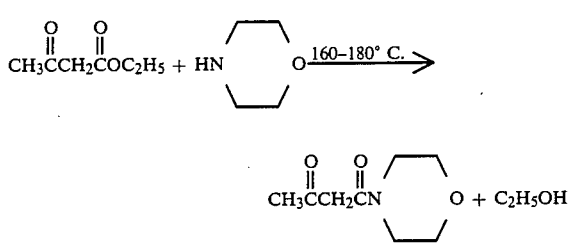

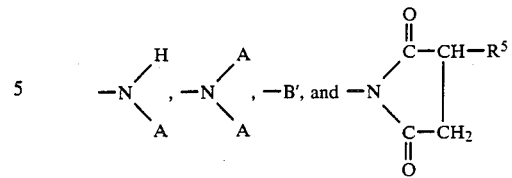

The presence of alcohol as a by-product and the absence of the proton NMR signal for —O—C$_2$CH$_5$ for the material made at the higher temperature shows that the procedure employed by U.S. Pat. No. 4,579,675 produces a significantly different product than those disclosed here.

Having described the invention by direct disclosure and by examples, certain variations should be apparent to those having an ordinary skill in the art, which variation would be considered to be equivalent to the invention claimed below.

We claim as our invention:

1. An oleaginous composition comprising: a lubricating oil and a dispersant effective amount of an adduct of the formula:

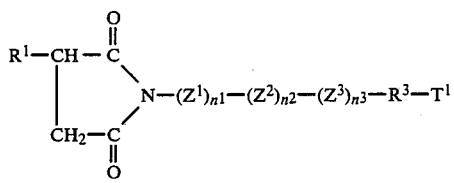

wherein $Z^1$ and $Z^3$ are the same or different and are moities of the formula:

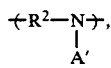

$Z^2$ ia a moiety of the formula:

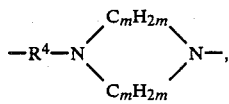

wherein $R^2$, $R^3$ and $R^4$ are the same or different and are alkylene of from 1 to 6 carbon atoms, m is an integer of from 1 to 5, each A' is independently selected from the group consisting of H, A and the moiety:

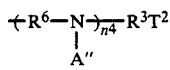

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

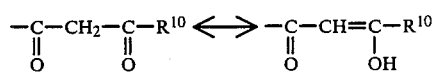

wherein B' is substituted or unsubstituted alkyl or arylcontaining group, $n^1$ is an integer of 0 to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{M}_n$) between about 650 and 3,500, and wherein A comprises a tautomeric substituent of the formula:

$$-\underset{\underset{O}{\|}}{C}-CH_2-\underset{\underset{O}{\|}}{C}-R^{10} \Longleftrightarrow -\underset{\underset{O}{\|}}{C}-CH=\underset{\underset{OH}{|}}{C}-R^{10}$$

wherein $R^{10}$ is substituted or unsubstituted alkyl or aryl containing groups, with the proviso that at least one of the A' or A" groups comprises said tautomeric substituent.

2. The composition of claim 1 wherein $R^1$ and $R^5$ are polyisobutylene.

3. The composition of claim 2 wherein the polyisobutylene has a $\overline{M}_n$ between about 900 and about 2,500.

4. The composition of claim 3 wherein the polyisobutylene has a $\overline{M}_n$ between about 1,300 and about 2,200.

5. The adduct of claim 3 which has been borated.

6. The composition of claim 2 wherein $R^2$, $R^4$ and $R^6$ each are alkylene of from 2 to 4 carbon atoms.

7. The composition of claim 6 wherein $R^2$, $R^4$ and $R^6$ each are —CH$_2$CH$_2$—.

8. The composition of claim 7 wherein $n^2$ is zero and the sum of $n^1$, $n^3$ and $n^4$ is from 3 to 7.

9. The composition of claim 8 wherein $R^{10}$ is a methyl group.

10. The composition of claim 7 wherein $R^{10}$ is a methyl group.

11. The composition of claim 2 wherein $n^2$ is zero and the sum of $n^1$, $n^3$ and $n^4$ is from 3 to 7.

12. The composition of claim 2 wherein $R^{10}$ is a methyl group.

13. The composition of claim 2 wherein said lubricating oil is present in a major amount.

14. The composition of claim 1 wherein $R^{10}$ is a methyl group.

15. The composition of claim 1 also containing a detergent material.

16. The composition of claim 15 wherein the detergent material is an overbased alkaline earth metal sulfonate, an overbased alkaline earth metal phenate or mixture thereof.

17. The composition of claim 16 wherein the alkaline earth metal is calcium.

18. The composition of claim 16 wherein the alkaline earth metal is magnesium.

19. The composition of claim 16 wherein the alkaline earth metal is a mixture of calcium and magnesium.

20. The composition of claim 1 wherein said lubricating oil is present in a major amount.

21. The composition of claim 1 also containing a friction modifier material.

22. The composition of claim 1 also containing an antiwear material.

23. The composition of claim 22 wherein the antiwear material is a zinc dihydrocarbyl dithiophosphate.

24. The adduct of claim 23 which has been borated.

25. The composition of claim 1 which has been borated.

26. An oleaginous composition comprising:
a lubricating oil, from 0.01-20 wt. % of a detergent material, from 0.001 to 5 wt. % of a zinc dihydrocarbyl dithiophosphate antiwear material, and from 0.1 to 20 wt. % of a dispersant effective amount of a mixture of at least one adduct having the formula:

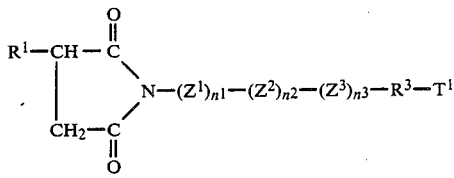

wherein $Z^1$ and $Z^3$ are the same or different and are moities of the formula:

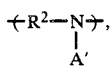

$Z^2$ is a moiety of the formula:

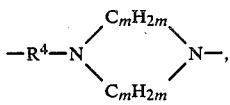

wherein $R^2$, $R^3$ and $R^4$ are the same or different and are alkylene of from 1 to 6 carbon atoms, m is an integer of from 1 to 5, each A' is independently selected from the group consisting of H, A and the moiety:

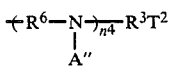

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

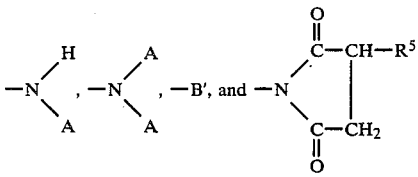

wherein B' is substituted or unsubstituted alkyl or aryl-containing group, $n^1$ is an integer of 0 to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{M}_n$) between about 650 and 3,500, and wherein A comprises a tautomeric substituent of the formula:

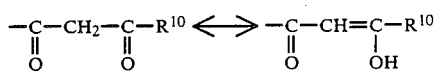

wherein $R^{10}$ is substituted or unsubstituted alkyl or aryl containing groups, with the proviso that at least one of the A' or A" groups comprises said tautomeric substituent.

27. The composition of claim 26 wherein $R^1$ and $R^5$ are polyisobutylene.

28. The composition of claim 27 wherein the polyisobutylene has a $\overline{M}_n$ between about 900 and about 2,500.

29. The composition of claim 28 wherein the polyisobutylene has a $\overline{M}_n$ between about 1,300 and about 2,200.

30. The composition of claim 28 wherein $n^2$ is zero and the sum of $n^1$, $n^3$ and $n^4$ is from 3 to 7.

31. The composition of claim 30 wherein said lubricating oil is present in a major amount.

32. The composition of claim 28 which has been borated.

33. The composition of claim 27 wherein $R^2$, $R^4$ and $R^6$ are each alkylene of from 2 to 4 carbon atoms.

34. The composition of claim 33 wherein $R^2$, $R^4$ and $R^6$ are each —$CH_2CH_2$—.

35. The composition of claim 34 wherein $n^2$ is zero and the sum of $n^1$, $n^3$ and $n^4$ is from 3 to 7.

36. The composition of claim 35 wherein $R^{10}$ is a methyl group.

37. The composition of claim 35 which has been borated.

38. The composition of claim 34 wherein $R^{10}$ is a methyl group.

39. The composition of claim 34 wherein said lubricating oil is present in a major amount.

40. The compositionof claim 34 also containing a friction modifier material.

41. The compositionof claim 27 wherein $R^{10}$ is a methyl group.

42. The composition of claim 27 wherein said lubricating oil is presnet in a major amount.

43. The composition of claim 26 wherein $R^{10}$ is a methyl group.

44. The composition of claim 26 wherein the detergent material is an overbased alkaline earth metal sulfonate, an overbased alkaline earth metal phenate or a mixture thereof.

45. The composition of claim 44 wherein the alkaline earth metal is calcium.

46. The composition of claim 44 wherein the alkaline earth metal is magnesium.

47. The composition of claim 26 wherein said lubricating oil is present in a major amount.

48. The composition of claim 26 which has been borated.

* * * * *